US006807978B2

(12) United States Patent
Burke et al.

(10) Patent No.: US 6,807,978 B2
(45) Date of Patent: Oct. 26, 2004

(54) COVER ASSEMBLY FOR FUEL DELIVERY MODULE

(75) Inventors: David H. Burke, Flint, MI (US); Robert L. Farrar, Flint, MI (US)

(73) Assignee: Delphi Technologies, Inc., Troy, MI (US)

( * ) Notice: Subject to any disclaimer, the term of this patent is extended or adjusted under 35 U.S.C. 154(b) by 42 days.

(21) Appl. No.: 10/301,274

(22) Filed: Nov. 21, 2002

(65) Prior Publication Data

US 2004/0099309 A1 May 27, 2004

(51) Int. Cl.[7] .............................................. F16K 24/04
(52) U.S. Cl. ........................................ 137/202; 137/43
(58) Field of Search .................................. 137/43, 202

(56) References Cited

U.S. PATENT DOCUMENTS 4,654,191 A 3/1987 Krieg
4,678,097 A 7/1987 Crute
4,780,063 A 10/1988 Tuckey
5,018,546 A 5/1991 Carmack et al.
5,070,849 A 12/1991 Rich et al.
5,647,330 A * 7/1997 Sawert et al. ............... 137/571
5,762,049 A 6/1998 Jones et al.
5,791,317 A 8/1998 Eck
5,988,213 A 11/1999 Yoshioka
5,992,441 A * 11/1999 Enge et al. ................. 137/202
5,996,607 A * 12/1999 Bergsma et al. ............ 137/202
6,338,333 B1 1/2002 Brosseau et al.
6,405,711 B1 6/2002 Smith et al.

* cited by examiner

*Primary Examiner*—Gerald A. Michalsky
(74) *Attorney, Agent, or Firm*—Jimmy L. Funke

(57) ABSTRACT

A cover assembly for a fuel tank of a vehicle includes a cover adapted to close an opening in the fuel tank and an internal port operatively supported by the cover. The cover assembly also includes a fill limiting vent valve attached to the internal port to vent the fuel tank through the cover. The internal port includes at least one convolute therein.

15 Claims, 2 Drawing Sheets

COVER ASSEMBLY FOR FUEL DELIVERY MODULE

TECHNICAL FIELD

The present invention relates generally to fuel tanks for vehicles and, more particularly, to a cover assembly for a fuel delivery module in a fuel tank of a vehicle.

BACKGROUND OF THE INVENTION

It is known to provide a fuel tank in a vehicle to hold fuel to be used by an engine of the vehicle. In such a fuel tank, a cover is provided for a fuel delivery module to seal an opening through which the fuel delivery module has been assembled into the fuel tank. In some cases, the fuel delivery module consists only of a cover/flange to which either an electrical fuel pump and/or a mechanism for indicating fuel is attached. Recently, the trend has been to construct fuel delivery modules with an integral reservoir. Various valves, sensors, pressure regulators, as well as filters have been added over time. In some fuel tanks, a fuel limiting vent valve and other vent valves required for venting the fuel tank are mounted in the fuel tank and vented to a vehicle carbon canister.

The fill limiting vent valve (FLVV), as one of its functions, seals a vent of the fuel tank if the vehicle rolls over in an accident. In an accident, however, a side of the fuel tank may be crumpled and the FLVV impacted. The impact could damage or disconnect the FLVV, leaving an opening through which fuel may escape.

One attempt to solve this problem is to mount the FLVV to the fuel tank. In this configuration, a connector allows the FLVV to move with the tank, without being damaged. However, this configuration is not practical to allow the FLVV to be mounted on the reservoir assembly of the fuel delivery module because it leaves the valves mounted on the reservoir assembly vulnerable to damage.

Therefore, it is desirable to provide a cover assembly for a fuel delivery module of a fuel tank to mount a fill limiting vent valve for venting of the fuel tank. It is also desirable to provide a cover assembly for a fuel delivery module of a fuel tank that allows a fill limiting vent valve to move relative to the fuel tank. It is further desirable to provide a cover assembly for a fuel delivery module of a fuel tank with a fill limiting vent valve, which moves with a side of the fuel tank without damage or disengagement.

SUMMARY OF THE INVENTION

It is, therefore, one object of the present invention to provide a new cover assembly for a fuel delivery module in a fuel tank of a vehicle.

It is another object of the present invention to provide a cover assembly for a fuel delivery module that incorporates a fill limiting vent valve that is allowed to move.

To achieve the foregoing objects, the present invention is a cover assembly for a fuel delivery module in a fuel tank of a vehicle including a cover adapted to close an opening in the fuel tank and an internal port operatively supported by the cover. The cover assembly also includes a fill limiting vent valve attached to the internal port to vent the fuel tank through the cover. The internal port includes at least one convolute therein.

One advantage of the present invention is that a new cover assembly is provided for a fuel delivery module in a fuel tank of a vehicle that incorporates a fill limiting vent valve by eliminating the mounting of a fill limiting vent valve to the reservoir assembly in the fuel tank. Another advantage of the present invention is that the cover assembly allows the fill limiting vent valve to move relative to the fuel tank. Yet another advantage of the present invention is that the cover assembly allows the fill limiting vent valve to move with a side of the fuel tank without damage or disengagement. Still another advantage of the present invention is that the cover assembly can also be used to house and retain a fill limiting vent valve.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT

Figure 1:
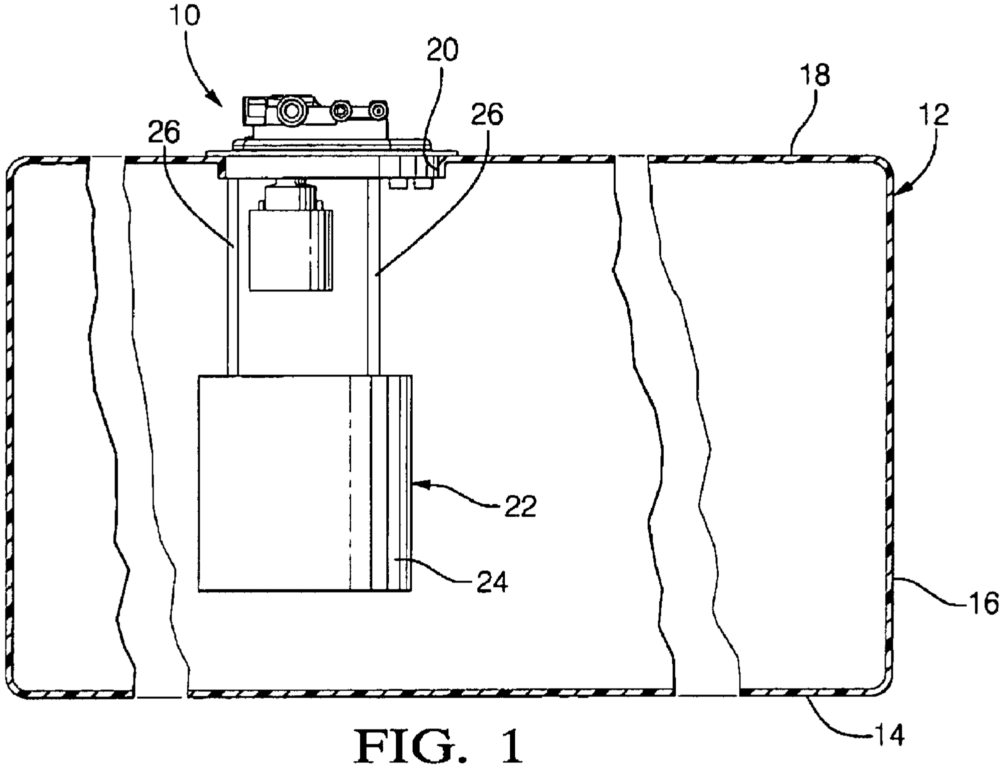
FIG. 1 is a perspective view of a cover assembly for a fuel delivery module, according to the present invention, illustrated in operational relationship with a fuel tank.
Figure 2:
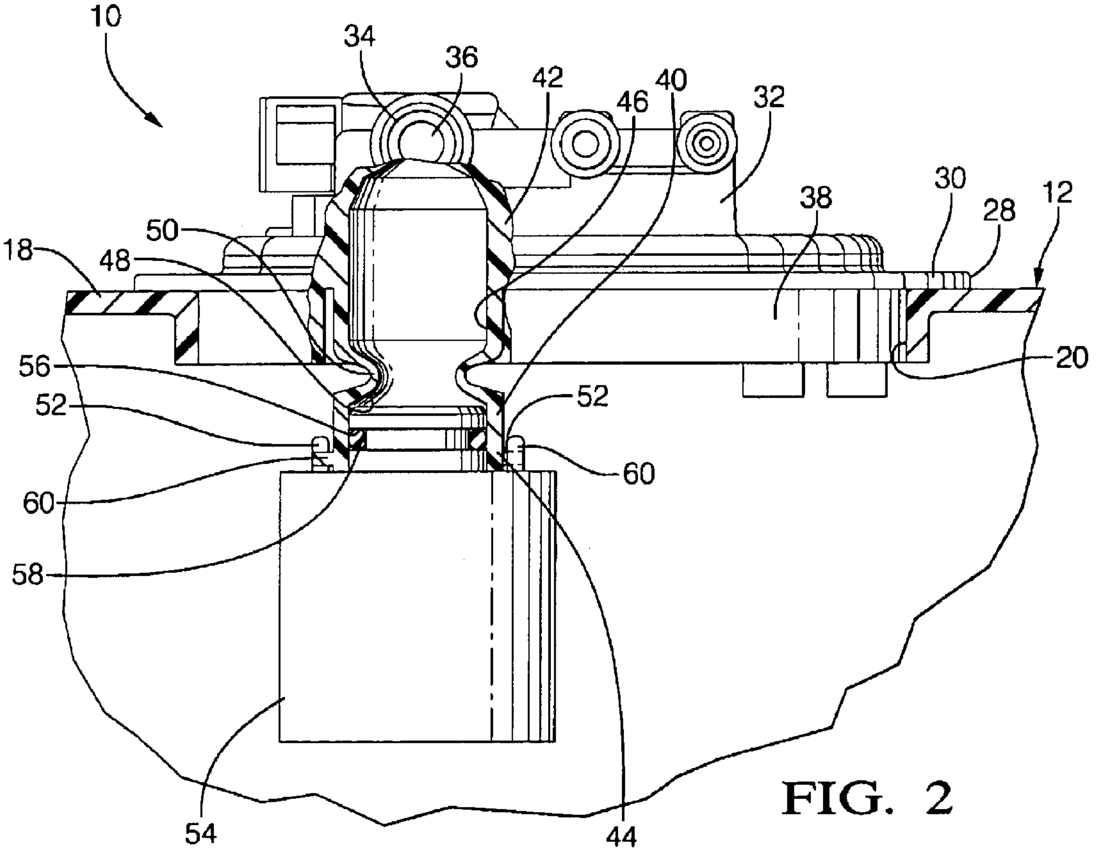
FIG. 2 is an enlarged fragmentary elevational view of the cover assembly of FIG. 1.

Referring to the drawings and in particular FIGS. 1 and 2, one embodiment of a cover assembly 10, according to the present invention, is shown for a fuel tank 12 of a vehicle (not shown). The fuel tank 12 includes a bottom wall 14, a side wall 16 extending around a periphery of the bottom wall 14 and extending generally perpendicular thereto, and a top wall 18 extending from an upper end of the side wall 16 and generally parallel to the bottom wall 14. The top wall 18 includes an opening 20 for the cover assembly 10. The fuel tank 12 is made of a rigid material such as plastic. It should be appreciated that, except for the cover assembly 10, the fuel tank 12 is conventional and known in the art.

As illustrated in FIG. 1, the cover assembly 10 is part of a fuel delivery module, generally indicated at 22. The fuel delivery module 22 is disposed in the fuel tank 12 to delivery fuel from the fuel tank 12 to an engine (not shown) of the vehicle. The fuel delivery module 22 includes a reservoir assembly 24 having an electrical fuel pump (not shown) mounted therein. The fuel delivery module 22 further includes a plurality of guide rods or tubes 26 to mechanically connect the cover assembly 10 with the reservoir assembly 24.

Referring to FIG. 2, the cover assembly 10 includes a cover 28 to cover or close the opening 20. The cover 28 is generally circular in shape. The cover 28 includes a base wall 30 having a raised portion 32. The raised portion 32 has a vent port or tube 34. The vent tube 34 extends radially from the raised portion 32 and has a passageway 36 of a predetermined diameter such as ⅝ inches extending axially therethrough for a function to be described. The cover 28 further includes a skirt or side wall 38 extending generally perpendicular and axially from the base wall 30. The cover 28 is made from a rigid material such as plastic. It should be appreciated that a conduit (not shown) is attached to the vent tube 34 and a carbon canister (not shown) to vent fuel vapors from the fuel tank 12.

The cover 28 also includes an internal port or tube 40 extending toward the reservoir assembly 24. The internal port 40 has a first end 42 connected to the raised portion 32 and extending downwardly to a free end 44. The internal port 40 has a passageway 46 extending axially therethrough and communicating with passageway 36 of the vent tube 34. The internal port 40 also has at least one convolute 48 therein to increase the flexibility of the port 40 in that area. Preferably, the convolute 48 is spaced between the first end 42 and the second end 44. The wall of the convolute 48 may have a thinned portion 50 having a thickness less than a thickness of the wall of the internal port 40 to further improve flexibility of the internal port 40. The internal port 40 further includes at least one, preferably a plurality, more preferably two, projections or knobs 52 extending radially outwardly from the second end 44 for a function to be described. The internal port 40 is made of rigid material such as plastic. Preferably, the cover 28 and internal port 40 are molded as one-piece being integral and unitary by conventional injection molding processes. It should be appreciated that the internal port 40 is connected to a fill limiting vent valve to be described disposed in the interior of the fuel tank 12. It should also be appreciated that the convolute 48 is easy to mold.

The cover assembly 10 includes a fill limiting vent valve 54 extending into the passageway 46 of the internal port 40. The fill limiting vent valve 54 is generally cylindrical and circular in shape and has an annular groove or channel 56 in an upper end thereof. The fill limiting vent valve 54 also includes a seal 58 such as an o-ring disposed in the groove 56. The cylindrical wall of the internal port 40 provides sealing for the seal 58 attached to the fill limiting vent valve 54. The fill limiting vent valve 54 further includes at least one, preferably a plurality of, more preferably two, retention hooks 60 extending therefrom. The retention hooks 60 are generally "L" shaped and cooperate with the knobs 52 to provide mechanical retention of the fill limiting vent valve 54 to the internal port 40. The retention hooks 60 are preferably molded onto the fill limiting vent valve 54. It should be appreciated that the retention hooks 60 are equal in number to the knobs 52. It should also be appreciated that the fill limiting vent valve 54 vents to a charcoal canister (not shown) through the vent tube 34. It should further be appreciated that the fill limiting vent valve 54 is conventional and known in the art.

In manufacture of the cover assembly 10, the cover 28 is molded by conventional processes such as injection molding. The fill limiting vent valve 54 is assembled to the cover 28 by pushing the fill limiting vent valve 54 with the seal 58 into the end of the internal port 40 and secured with a twist to allow the hooks 60 to be engaged with the knobs 52 to retain the vent valve 54 to the internal port 40. The cover 28 is then secured to the top wall 18 of the fuel tank 12 by suitable means. It should be appreciated that the process of securing the cover 28 to the top wall 18 is conventional and known in the art. It should also be appreciated that the internal port 40 allows the fill limiting vent valve 54 to move with a side of the fuel tank 12 without damage or disengagement.

Figure 3:
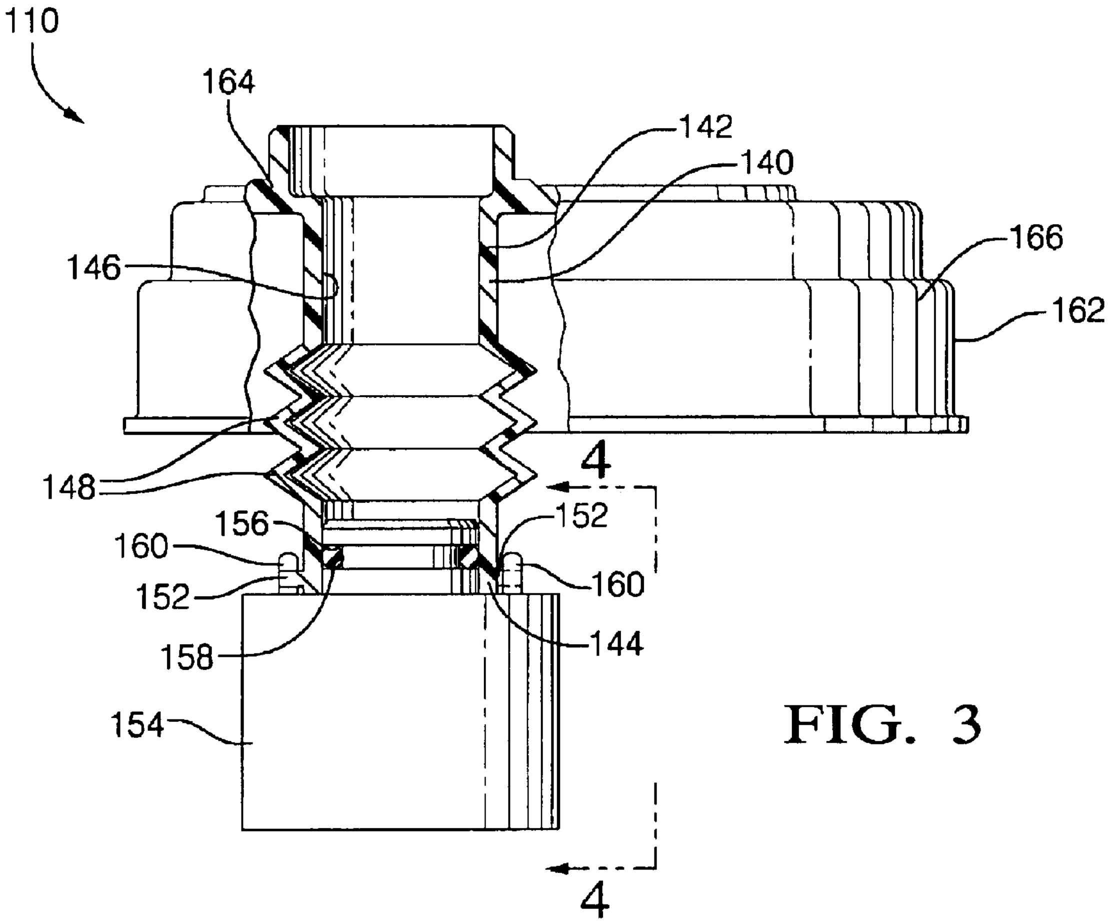
FIG. 3 is an enlarged fragmentary elevational view of another embodiment, according to the present invention, of the cover assembly of FIG. 1.
Figure 4:
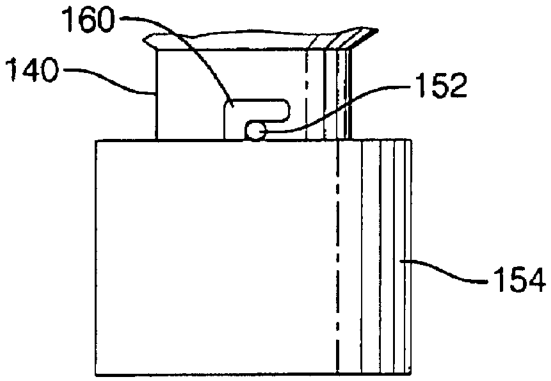
FIG. 4 is a sectional view taken along line 4—4 of FIG. 3.

Referring to FIGS. 3 and 4, another embodiment, according to the present invention, of the cover assembly 10 is shown. Like parts of the cover assembly 10 have like reference numerals increased by one hundred (100). In this embodiment, the cover assembly 110 includes an adapter or carrier 162 disposed within and molded to the cover 28. The adapter 162 is generally circular in shape. The adapter 162 includes a base wall 164 and a skirt or side wall 166 extending generally perpendicular and axially from the base wall 164. The adapter 162 is made from a rigid material such as plastic. It should be appreciated that the adapter 162 is attached to the cover 28 by latching a plurality of the retaining snaps (not shown) into an equivalent number of apertures (not shown) in the skirt 166 of the cover 28. It should be appreciated that, in this embodiment, the cover 28 is made of a metal material.

The adapter 162 also includes an internal port or tube 140 extending toward the reservoir assembly 124. The internal port 140 has a first end 142 connected to the base wall 164 and extending downwardly to a free end 144. The internal port 140 has a passageway 146 extending axially therethrough and communicating with a passageway (not shown) in the cover 28. The internal port 140 also has a plurality of convolutes 148 therein to increase the flexibility of the port 140 in that area. Preferably, the convolutes 148 are spaced between the first end 142 and the second end 144. The internal port 140 further includes at least one, preferably a plurality, more preferably two, projections or knobs 152 extending radially outwardly from the second end 144 for a function to be described. The internal port 140 is made of rigid material such as plastic. Preferably, the adapter 162 and internal port 140 are molded as one-piece being integral and unitary by conventional injection molding processes. It should be appreciated that the convolutes 148 give more flexibility.

The cover assembly 110 includes a fill limiting vent valve 154 extending into the passageway 146 of the internal port 140. The fill limiting vent valve 154 is generally cylindrical and circular in shape and has an annular groove or channel 156 in an upper end thereof. The fill limiting vent valve 154 also includes a seal 158 such as an o-ring disposed in the groove 156. The cylindrical wall of the internal port 140 provides sealing for the seal 158 attached to the fill limiting vent valve 154. The fill limiting vent valve 154 further includes at least one, preferably a plurality of, more preferably two, retention hooks 160 extending therefrom. The retention hooks 160 are generally "L" shaped (FIG. 4) and cooperate with the knobs 152 to provide mechanical retention of the fill limiting vent valve 154 to the internal port 140. The retention hooks 160 are preferably molded onto the fill limiting vent valve 154. It should be appreciated that the retention hooks 160 are equal in number to the knobs 152. It should also be appreciated that the manufacture of the cover assembly 110 is similar to the cover assembly 10.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A cover assembly for a fuel tank of a vehicle comprising:

a cover adapted to close an opening in the fuel tank;

an internal port operatively supported by said cover and having a free end and at least one convolute interposed between the free end and the cover; and a fill limiting vent valve attached to said free end of said internal port to vent the fuel tank through said cover.

2. A cover assembly as set forth in claim 1 wherein said at least one convolute has a wall with a thickness less than a thickness of a wall of said internal port.

3. A cover assembly as set forth in claim 1 wherein said internal port includes a plurality of convolutes therein.

4. A cover assembly as set forth in claim 1 wherein said internal port has at least one projection extending radially outwardly from said free end.

5. A cover assembly as set forth in claim 4 wherein said fill limiting vent valve has at least one retention hook cooperating with said at least one projection to retain said fill limiting vent valve to said internal port.

6. A cover assembly for a fuel tank of a vehicle comprising:

a cover adapted to close an opening in the fuel tank having a fuel reservoir disposed therein;

a vent port extending from said cover;

an internal port operatively supported by said cover and fluidly communicating with said vent port; said internal port having a free end and at least one convolute interposed between the free end and the cover; and a fill limiting vent valve attached to said internal port to vent the fuel tank through said vent port.

7. A cover assembly as set forth in claim 6 wherein said at least one convolute has a wall with a thickness less than a thickness of a wall of said internal port.

8. A cover assembly as set forth in claim 6 wherein said internal port includes a plurality of convolutes therein.

9. A cover assembly as set forth in claim 6 wherein said internal port comprises at least one projection extending radially outwardly from said free end.

10. A cover assembly as set forth in claim 9 wherein said fill limiting vent valve has at least one retention hook cooperating with said at least one projection to retain said fill limiting vent valve to said internal port.

11. A fuel tank assembly comprising:

a fuel tank having an opening formed in a wall thereof;

a fuel reservoir disposed within said fuel tank;

a cover assembly operatively connected to said fuel reservoir to close said opening; and wherein said cover assembly comprises a cover closing the opening in the fuel tank, an internal port operatively supported by said cover, said internal port having a free end within the fuel tank and at least one convolute interposed between the free end and the cover; and a fill limiting vent valve attached to said free end of said internal port to vent the fuel tank through said cover to a vapor canister.

12. A fuel tank assembly as set forth in claim 11 wherein said at least one convolute has a wall with a thickness less than a thickness of a wall of said internal port.

13. A fuel tank assembly as set forth in claim 11 wherein said internal port includes a plurality of convolutes therein.

14. A fuel tank assembly as set forth in claim 11 wherein said internal port comprises at least one projection extending radially outwardly from said free end.

15. A fuel tank assembly as set forth in claim 14 wherein said fill limiting vent valve has at least one retention hook cooperating with said at least one projection to retain said fill limiting vent valve to said internal port.

* * * * *